United States Patent
Kittaka et al.

(10) Patent No.: US 6,919,953 B2
(45) Date of Patent: Jul. 19, 2005

(54) METHOD FOR MEASURING GRADIENT INDEX DISTRIBUTION OF ROD LENS

(75) Inventors: Shigeo Kittaka, Osaka (JP); Minoru Taniyama, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 238 days.

(21) Appl. No.: 10/067,858

(22) Filed: Feb. 8, 2002

(65) Prior Publication Data

US 2002/0140929 A1 Oct. 3, 2002

(30) Foreign Application Priority Data

Feb. 9, 2001 (JP) .................................... P2001-033899

(51) Int. Cl.[7] ........................... G01B 9/00; G01N 21/41
(52) U.S. Cl. ...................................... 356/124; 356/128
(58) Field of Search ............................. 356/124, 124.5, 356/127, 128; 359/651–653

(56) References Cited

U.S. PATENT DOCUMENTS

RE33,227 E  *  6/1990  Baba ......................... 359/654
5,949,585 A  *  9/1999  Kittaka ...................... 359/654

FOREIGN PATENT DOCUMENTS

JP          55044949 A  *  3/1980  .......... G01M/11/00

OTHER PUBLICATIONS

Toyama, Minoru, et al., "Measurement and Analysis of Spherical Aberration of Gradient–index Rod Lenses", Optics, vol. 11, No. 6, (Dec. 1982).

* cited by examiner

*Primary Examiner*—Zandra V. Smith
*Assistant Examiner*—Gordon J. Stock, Jr.
(74) *Attorney, Agent, or Firm*—Whitham, Curtis & Christofferson, P.C.

(57) ABSTRACT

A method of measuring a radial index distribution of a rod lens has the steps: (1) the rod lens is processed so that the length is approximately P/2 (where P is pitch length) or an integer multiple thereof and so end surfaces parallel, (2) a patterned surface is set as an object surface in the proximity of one end surface, and an image surface is formed in the proximity of the other end surface by irradiating the patterned surface with condensed monochromatic light, (3) the positions of paraxial focal points and the curves of curvature of field are obtained by observing the image surface, and (4) higher-order index distribution coefficients are calculated back by a fitting process on the basis of the positions of paraxial focal points and the curves of curvature of field.

6 Claims, 5 Drawing Sheets

$h_4 = -1.0$
OBJECT SURFACE — IMAGE SURFACE
CURVATURE OF FIELD(mm) 0.2

$h_4 = +0.67$
OBJECT SURFACE — IMAGE SURFACE
CURVATURE OF FIELD(mm) 0.05

$h_4 = +2.0$
OBJECT SURFACE — IMAGE SURFACE
CURVATURE OF FIELD(mm) 0.2

METHOD FOR MEASURING GRADIENT INDEX DISTRIBUTION OF ROD LENS

BACKGROUND OF THE INVENTION

The present invention relates to a method for measuring a gradient index distribution of a rod lens and particularly to a method for measuring a gradient index distribution of a gradient index rod lens by calculating higher-order index distribution coefficients of the rod lens on the basis of measurement of curvature of field. The method according to the invention is a technique particularly useful for evaluation of optical performance of a small-diameter rod lens.

As known commonly, a gradient index rod lens is a lens having a columnar transparent body to which a distribution of refractive index symmetric with respect to the optical axis of the lens is given. The refractive index of the lens is distributed so that the refractive index is high on the optical axis but is reduced continuously toward the periphery of the lens. The gradient index rod lens of this type has been used as a collimator lens or the like in an optical communication system, an optical measurement control system or the like because reduction in size and weight can be achieved. In addition, a lens array constituted by a large number of the gradient index rod lenses of this type arranged regularly in the form of an array has been used as a scanning optical system in a copying machine, a facsimile machine, a printer or the like.

Various methods have been proposed for giving a gradient index distribution to a columnar transparent body (glass rod). The method put into most practical use is an ion exchange method. This is a method in which a glass rod containing high-refractive-index ions is immersed in molten salt containing low-refractive-index ions to disperse the two types of ions into each other to thereby form a distribution of refractive index (gradient index distribution) approximately proportional to the distribution of ion concentrations.

The optical performance of the rod lens of this type mainly depends on the shape of the gradient index distribution. It is therefore necessary to control the distribution for production of the lens. For this reason, the gradient index distribution is required to be measured accurately. In addition, index distribution coefficients are very important as basic data for evaluation of variation in ion exchange and lens design or for system design using such a rod lens.

As a method for obtaining a gradient index distribution of a gradient index rod lens, there has been heretofore used a method of calculating back the gradient index distribution by measuring spherical aberration of a P/4 lens (in which P represents a paraxial period length) (see"Measurement and Analysis of Aberration of Gradient Index Lens", Optics Vol. 11, No. 6 (December 1982)).

Also in the rod lens, spherical aberration can be obtained by direct measurement of the locus of laser light. That is, because laser light incident on one end surface of a lens to be inspected passes through the lens and exits from the other end surface of the lens, the locus of light rays is obtained by observation of exit light rays. When the measurement is repeated while the position of incidence of light is changed, flux of exit light rays is obtained so that spherical aberration can be obtained. The related-art method is a method in which a light ray equation is solved by a perturbation method in consideration of a gradient index distribution of a gradient index rod lens up to higher-order terms to thereby obtain approximate solutions to parallel light incidence so that spherical aberration of the lens is measured by application of the approximate solutions to thereby obtain index distribution constants.

In the related-art method using the measurement of spherical aberration, it is however necessary that the measurement is repeated while the position of incidence of light is changed in a direction of the radius of the rod lens. Accordingly, it is difficult to measure spherical aberration particularly when the small-diameter rod lens has a diameter not larger than about 1 mm. With the advance of reduction in size of various kinds of optical devices in recent years, the rod lens to be incorporated in each of the optical devices is required to have a further smaller diameter. Accordingly, the index distribution coefficients can be hardly obtained by the related-art method.

In addition, the related-art method needs laser light as a light source. Hence, there is also a problem that the wavelength for measurement is limited to the wavelength of laser light used.

SUMMARY OF THE INVENTION

An object of the invention is to provide a method for measuring a gradient index distribution of a rod lens in which higher-order index distribution coefficients can be obtained accurately even if the rod lens has a small diameter and in which the wavelength for measurement can be selected relatively freely.

According to the invention; there is provided a method of measuring a radial gradient index distribution n(r) of a rod lens by calculating higher-order index distribution coefficients indicating the gradient index distribution n(r) when n(r) is given by the expression:

$$n(r)^2 = n_0^2 \cdot \{1 - (g \cdot r)^2 + h_4(g \cdot r)^4 + h_6(g \cdot r)^6 + h_8(g \cdot r)^8 + \cdots \}$$

in which r is a radial distance measured from an optical axis, $n_0$ is a refractive index on the optical axis, g is a secondary index distribution coefficient, and $h_4$, $h_6$ and $h_8$ are higher-order index distribution coefficients, the method comprising the steps of:

(1) processing the rod lens so that the optic-axial length of the rod lens is approximately equal to P/2 (in which P represents a paraxial period length (pitch) defined as $P=2\pi/g$) or approximately equal to an integer multiple of P/2 and so that opposite end surfaces of the rod lens are shaped like parallel planes;

(2) setting a patterned surface as an object surface in the proximity of one end surface of the rod lens and forming an image surface in the proximity of the other end surface of the rod lens by irradiating the patterned surface with condensed monochromatic light;

(3) obtaining the position of a paraxial focal point and the curve of curvature of field by observing the image surface; and (4) calculating back higher-order index distribution coefficients by a fitting process on the basis of the position of the paraxial focal point and the curve of curvature of field.

Here, preferably, the patterned surface has a striped structure in which a large number of straight lines are arranged in parallel with one another or a lattice structure in which a large number of straight lines are arranged crosswise and in parallel with one another so that the positions of focal points on a plurality of lines are measured in a direction of the arrangement of lines from the center of the lens (optical axis) to thereby obtain the curves of curvature of field of meridional image surface in accordance with distances from the optical axis of the lens.

The present disclosure relates to the subject matter contained in Japanese patent application No. 2001-033899 (filed on Feb. 9, 2001), which is expressly incorporated herein by reference in its entirety.

DESCRIPTION OF THE PREFERRED EMBODIMENT

In the invention, typically, curves of (particularly meridional) curvature of field of a lens having a lens length of about P/2 (in which P is a pitch indicating the length of a paraxial snaking period in the lens) are measured so that index distribution coefficients of the lens are calculated back software-wise to be fitted to the curve.

Figure 1:
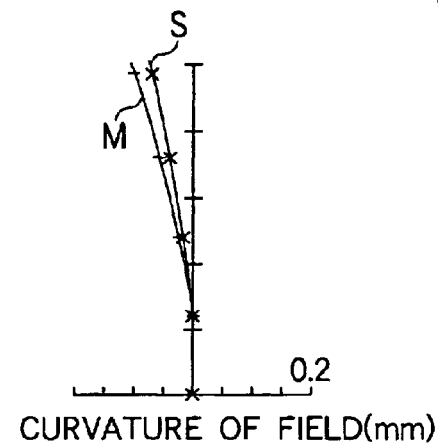
FIG. 1 is an explanatory view showing the relation between optical path and curve of curvature of field in accordance with the change of the value of $h_4$.
Figure 1:
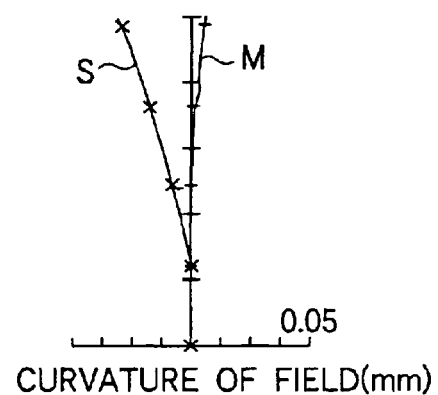
Figure 1:
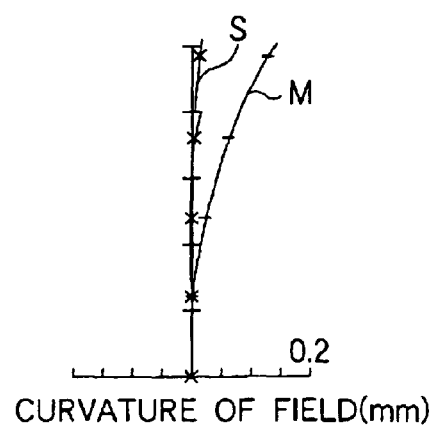

As shown in FIG. 1, when an images is formed between opposite end surfaces of a P/2 rod lens, an object surface and an image surface are located to be symmetric with respect to the rod lens. Accordingly, there is neither chromatic aberration nor distortion caused by asymmetry, so that the image has no aberration but spherical aberration and (sagital and meridional) curvature of field. Hence the curvature of field can be measured accurately if the spherical aberration of the lens is not extremely large.

Incidentally, if a rod lens having a lens length n times as large as P/2 (in which n is an integer, that is, the lens length is 1P, 1.5P, 2P, . . . ) is used, the quantity of aberration is also increased by n times so that measuring accuracy can be improved. It is, however, necessary to select the value of n suitably in accordance with the lens because the image becomes too blurred to make the measurement accurately if the lens is large in spherical aberration or is striated or asymmetrical. If a rod lens having a lens length of P/4 is used, a pattern is set in a distant place to make it difficult to measure a meridional image surface because of the influence of comatic aberration on the focused image. Accordingly, the use of a lens having such a lens length is unsuitable.

As an example for indicating the relation between index distribution coefficient and curvature of field, there was calculated the curvature of field of a P/2 rod lens having the following specifications.

Specifications of Model Lens
    Effective Radius $r_0$=0.125 mm
    Optic-axial Refractive Index $n_0$=1.682
    g value=3.15/mm
    Lens Length Z=0.997 mm (P/2)
    Object Surface and Image Surface: opposite end surfaces of the rod lens
    Object Height: 0.125 mm
Optical Path Chart and Field Curvature FIG. 1 shows optical path charts and curves of curvature of field in the respective cases of index distribution coefficient $h_4$ equal to −1.0, +0.67 and +2.0.

In the case of $h_4$=−1.0, a meridional image surface (M) and a sagital image surface (S) are both minus.

In the case of $h_4$=+0.67, the meridional image surface (M) is substantially flat but the sagital image surface (S) is minus.

In the case of $h_4$=+2.0, the meridional image surface (M) and the sagital image surface (S) are both plus.

As is obvious from FIG. 1, the measurement of field curvature data on the basis of the meridional image surface (M) is more accurate because the quantity of change of the meridional image surface (M) relative to $h_4$ is larger than that of the sagital image surface (S). In addition, when a striped pattern is used, the measurement can be made more easily on the basis of the meridional image surface because the meridional image surface is easy to view.

Figure 2:
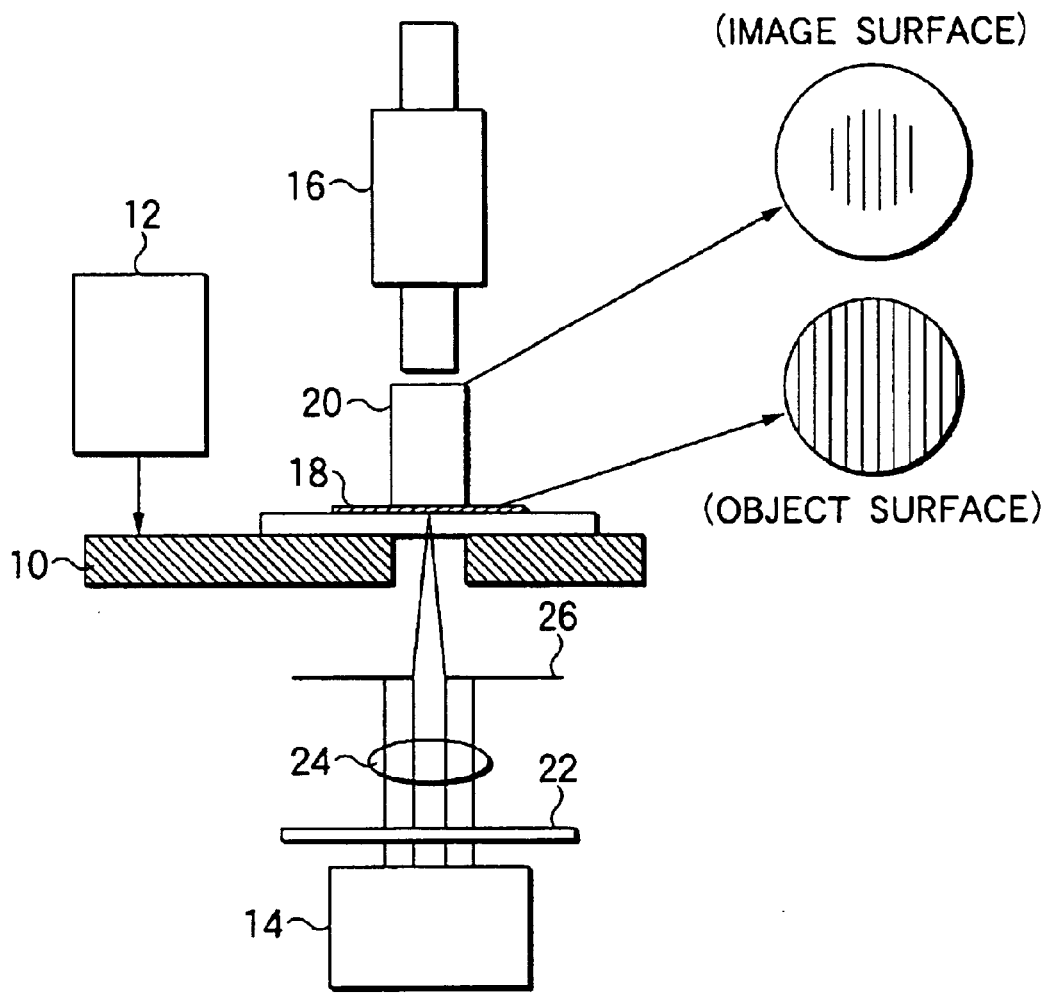
FIG. 2 is an explanatory view showing an example of a measuring apparatus.

FIG. 2 shows an example of a measuring apparatus. This apparatus mainly has a stage 10 movable finely vertically, a linear gauge 12 for measuring the height of the stage 10, a light source 14 located below the stage, and a microscope 16 located above the stage. A transparent parallel-striped pattern 18 is placed on the stage 10. A lens 20 to be inspected is placed on the pattern 18. The pitch of the parallel-striped pattern 18 is selected to be about ½₀ as large as the diameter of the lens. The parallel-striped pattern 18 is placed on the stage 10 so as to be striped longitudinally. The lens 20 to be inspected is a rod lens having a lens length of about P/2. Opposite end surfaces of the lens 20 to be inspected are shaped like planes perpendicular to the optical axis. Illumination light from the light source 14 is changed into monochromatic light with a measurement wavelength by an interference filter 22 and condensed onto the lower end surface of the lens 20 by a condenser lens 24. A stop 26 is provided on the exit side of the condenser lens 24 so that the numerical aperture (NA) of the illumination light is selected to be about 0.1. The magnification of the microscope 16 is selected so that the whole upper end surface of the lens 20 to be inspected can be viewed. An image surface near the upper end surface of the lens 20 to be inspected is observed with the microscope 16.

Figure 6:
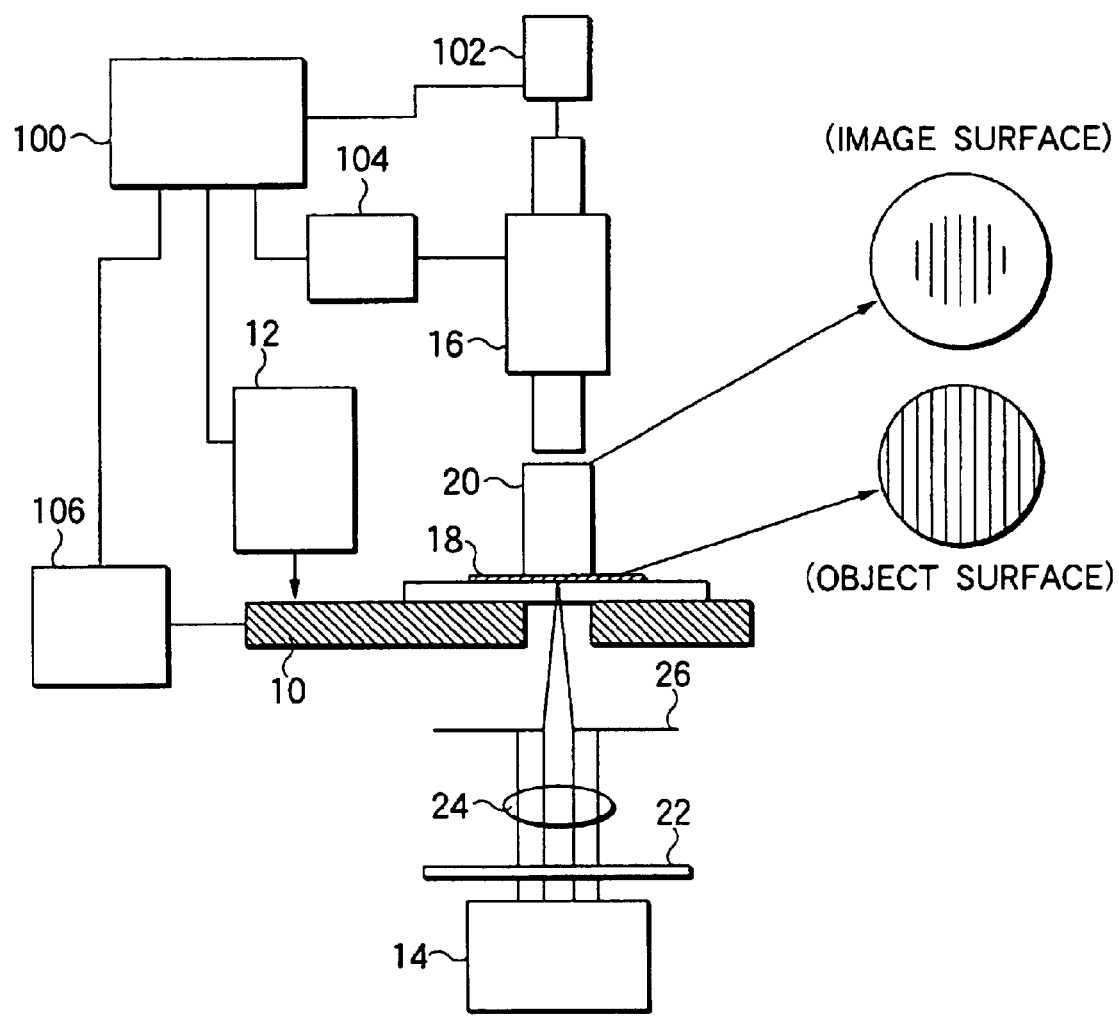
FIG. 6 is an explanatory view showing another example of the measuring apparatus.

As shown in FIG. 6, a CCD 102 may be connected to the microscope 16 to obtain digital data of the image obtained through the microscope 16, and a computing unit 100, such as a PC, may be connected to the CCD 102 for image processing, and for measurement and computation of values required for determining the higher-order index distribution coefficients $h_4$, $h_6$, $h_8$ . . . to be described later. In this case, the computing unit 100 has a storage medium which stores therein or which can install therein a program for executing a method of the present invention for determining the higher-order index distribution coefficients $h_4$, $h_6$, $h_8$ . . . to be described later, and also has an input section by which predetermined data, known values, measured values, etc., can be inputted. The computing unit 100 may further be connected to drivers for the microscope 16, the stage 10, the light source 14, etc. for control of these components, and also to the linear gage 12 for obtaining the height data of the stage 10. In FIG. 6, reference numeral 104 designates a driver for controlling the microscope 16. The computing unit 100 may further be connected to a driver 106 for moving the movable stage 10 in X-, Y- and Z directions. The computing unit 100 can adjust the height of the stage 10 (i.e. the position of the stage in the Z-direction), and obtain focal points based on image data obtained by the CCD 102 and height data obtained by the linear gage 12. Such measurement can be carried out at plural locations under the control of the computing unit 100 by moving the stage in lateral directions (i.e. in the X-direction and in the Y-direction) through the driver 106. The computing unit 100 can calculate and display the higher-order index distribution coefficients $h_4$, $h_6$, $h_8$ . . . based on the data thus obtained.

As for the measurement, the lens length is first measured accurately and the center refractive index $n_0$ of the lens is measured in advance. If the magnification of a microscope objective lens is set to be high (that is, NA is set to be large) in order to measure a small-diameter lens, measuring accuracy may be deteriorated because spherical aberration of the lens is picked up so that an image is blurred or a focal point is moved. To prevent the deterioration of measuring accuracy, the NA of illumination light may be preferably set to be small, for example, about 0.1, and it is undesirable to use any diffusing plate or the like. If the NA of the microscope objective lens is not larger than about 0.1, the consideration described above is not required because light rays with large NA are cut off.

Approximate values of index distribution coefficients can be calculated back by use of optical design software available on the market. For example, "Oslo Six" made by Sinclair Optics, Inc. in the U.S. may be used.

Figure 3A:
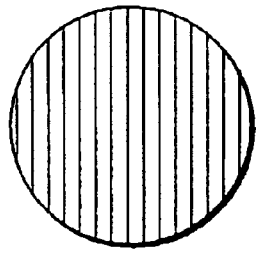
FIGS. 3A and 3B are explanatory views showing examples of the patterned surface.
Figure 3B:
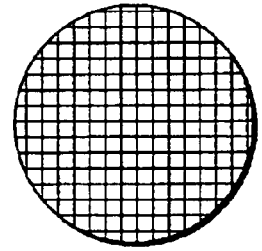

Although the example has shown the case where the patterned surface located on the object surface has a striped pattern in which a large number of straight lines are arranged in parallel with one another at regular intervals as shown in FIG. 3A, the invention may be applied also to the case where the patterned surface has a lattice pattern in which a large number of straight lines are arranged crosswise and in parallel with one another at regular intervals as shown in FIG. 3B.

Figure 4:
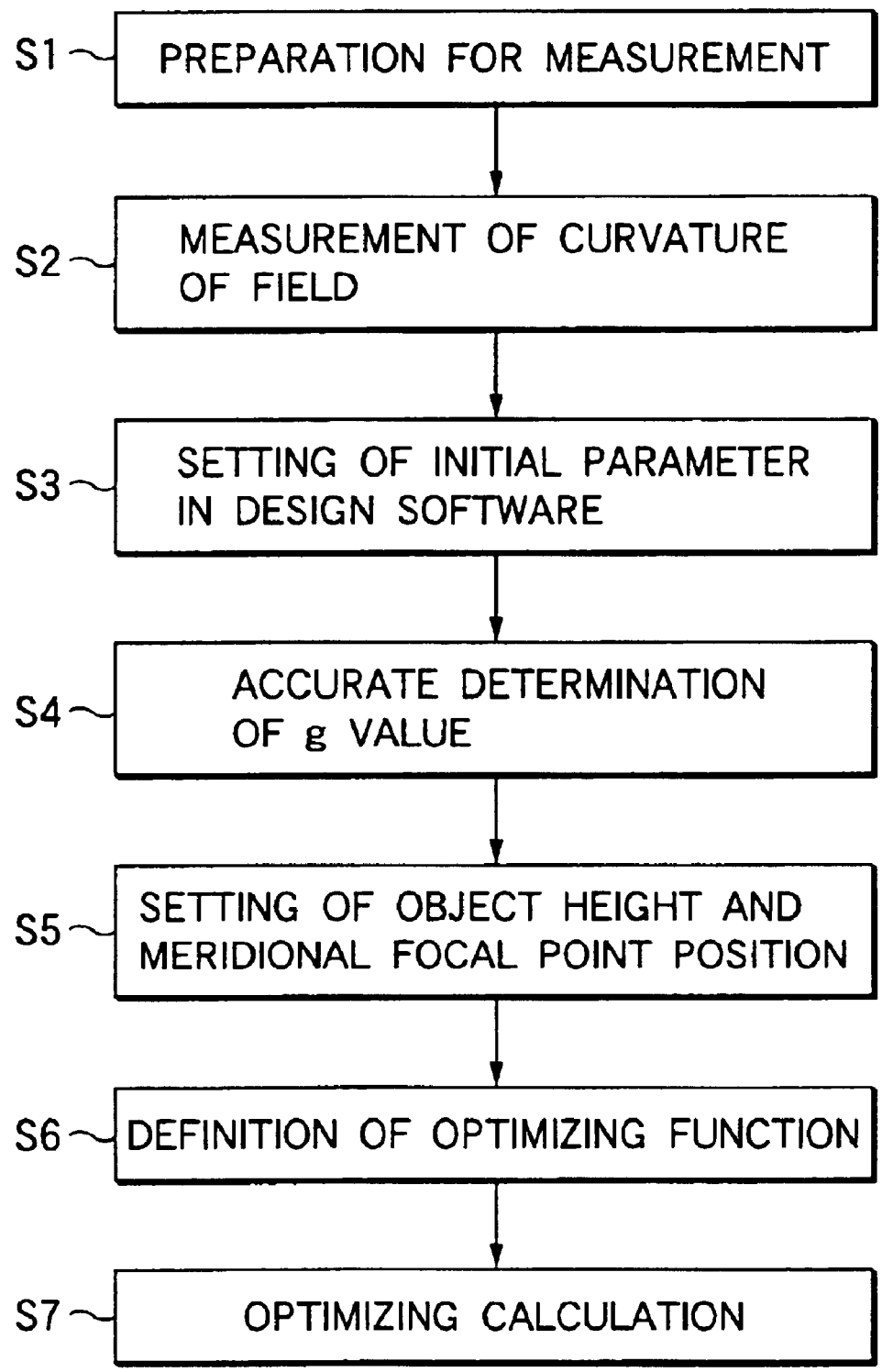
FIG. 4 is a flow chart showing a method for determining index distribution coefficients $h_4$, $h_6$ and $h_8$.

FIG. 4 shows steps for determining higher-order index distribution coefficients $h_4$, $h_6$ and $h_8$.

The first step, S1, is Preparation for Measurement.

The lens length Z (approximately equal to P/2) of the lens (having opposite ends shaped like planes) to be inspected is measured accurately.

The value of center refractive index $n_0$ of the lens is measured in advance.

The lens to be inspected is placed on the patterned surface of the measuring apparatus shown in FIG. 2.

The magnification of the microscope is selected so that the whole end surface of the lens can be viewed.

The second step, S2, is Measurement of Curvature of Field.

The position of a paraxial focal point $\Delta f_0$ is measured in the center of the lens with the lens end surface as the origin of the linear gauge (in which the outside of the lens is regarded as being plus and the inside of the lens as being minus).

The positions of (meridional) focal points $\Delta f_1$, $\Delta f_2$, $\Delta f_3$, ... of the respective lines in accordance with distances $r_1, r_2, r_3, ...$ from the optical axis are measured in the same manner as described above.

The third step, S3, is Setting of Initial Parameter with Design Software.

The lens radius is measured on the lens to be inspected.

The optic-axial refractive index $n_0$ is measured on the lens to be inspected.

The lens length Z is measured on the lens to be inspected.

The index distribution coefficient g value is initialized to $\pi/Z$.

$h_4$, $h_6$ and $h_8$ are all set to be zero.

The object surface is made coincident with one end surface of the lens.

The image surface is set in a position far by the paraxial focal point position $\Delta f_0$ from the other end surface of the lens.

The light source with respect to the object surface is provided as a telecentric structure (in which main light rays are parallel with the optical axis).

The fourth step, S4, is Accurate Determination of g Value.

The q value is adjusted so finely that the paraxial focal point of the lens to be inspected is made coincident with the image surface.

The fifth step, S5, is Setting of Object Height and Meridonal Focal Point Position.

Points of object height $r_1, r_2, r_3, ...$ are set on the object surface.

A distance $z_1$ from the image surface=$\Delta f_1 - \Delta f_0$ is set as a target value of the meridional focal point position of luminous flux exiting from the point of object height $r_1$.

$z_2, z_3, ...$ are set in the same manner as described above.

The sixth step, S6, is Definition of Optimizing Function.

The difference from the target value is defined as follows:

$$\Delta z_i = z_i' - z_i$$

in which $z_1', z_2', z_3', ...$ are calculated values of the meridional focal point position of the luminous flux exiting from the point of object height $r_1$.

An optimizing function (merit function) is defined as follows.

$$F = \Delta z_1^2 + \Delta z_2^2 + \Delta z_3^2 +$$

The seventh step, S7, is Optimizing Calculation.

Optimizing calculation is performed by use of optical design software. That is, the optimizing function F is minimized with $h_4$, $h_6$ and $h_8$ as variables.

EXAMPLE

An example of the measurement result will be described. Specifications of the lens to be inspected are as follows.

Lens Outer Diameter: 0.25 mmΦ

Effective Radius $r_0$=0.125 mm

Length Z=1.001 mm (about P/2)

Center Refractive Index $n_0$=1.682

Measurement was made on five lens samples to be inspected (of the same lot number).

Measurement conditions are as follows.

Parallel Striped Pattern: 100 line-pairs per mm

Measurement Wavelength: λ=654 nm

Microscope Objective Lens: Plan 40 magnifying power (NA=0.65)

Microscope Eyepiece: 10 magnifying power

Light Source: NA≈0.1

When the average value of $\Delta f_0$ was regarded as being in the paraxial focal point position, the value of the secondary index distribution coefficient g was as follows.

$$g=3.113/mm$$

Figure 5:
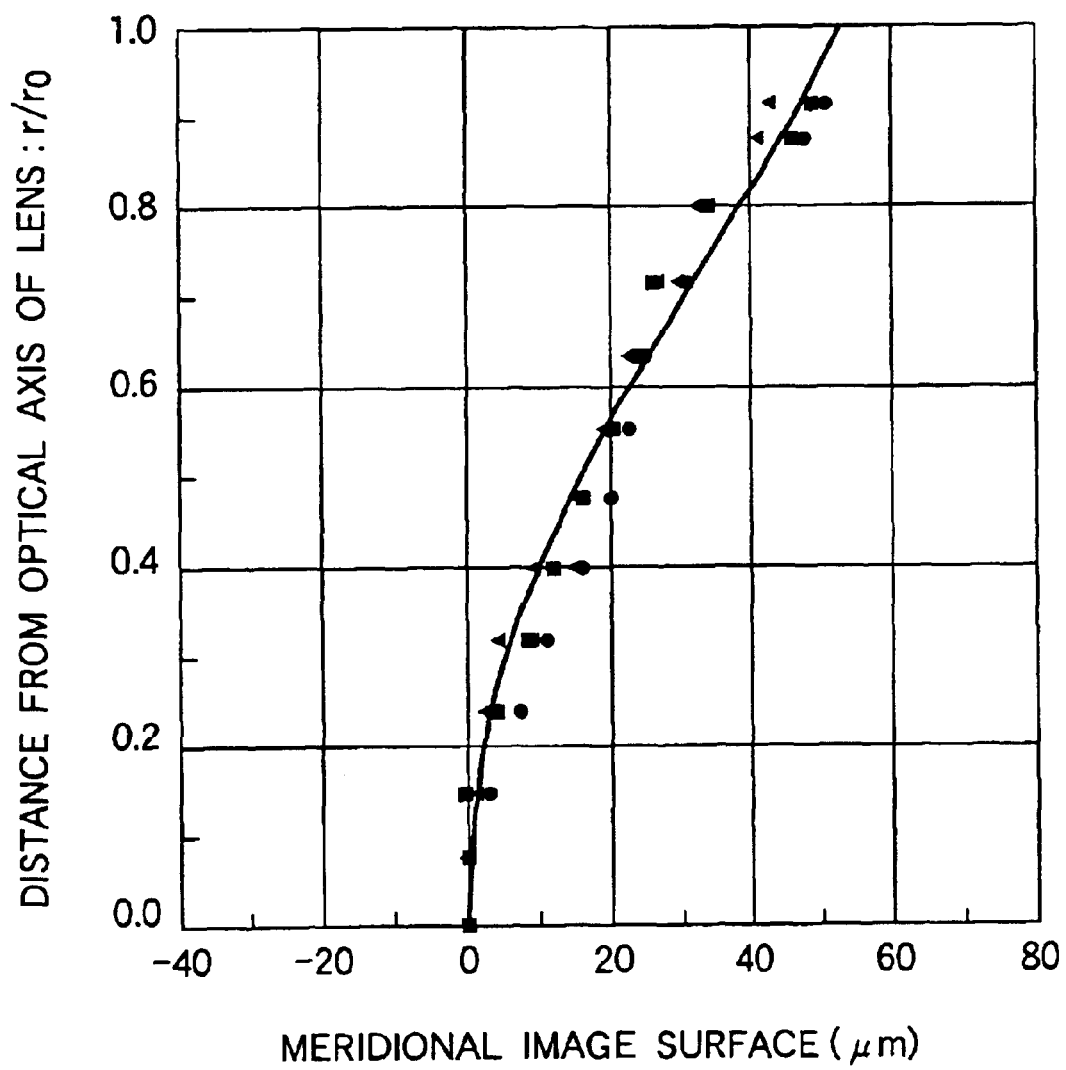
FIG. 5 is an explanatory view showing fitting of the index distribution coefficients.

FIG. 5 shows curvature of field of five lens samples to be inspected (the relation between the distance from the optical axis of each lens sample and the meridional focal point position) Measured data are plotted on the graph shown in FIG. 5. Variation in lens samples of the same lot number was so small that reproducible data were obtained. Fitting was performed by use of optical design software "Oslo Six" made by Sinclair Optics, Inc. in the U.S. on the basis the graph of curvature of field to thereby obtain the following values.

$$h_4 = +1.639$$

$$h_6 = -3.20$$

$$h_8 = +2.57$$

Curvature of field calculated on the basis of these index distribution coefficients is expressed as a solid line in FIG. 5. As is obvious from FIG. 5, the calculated values coincide with the measured values well. It is confirmed from this fact that the higher-order index distribution coefficients $h_4$, $h_6$ and $h_8$ can be obtained accurately and that the gradient index distribution of the rod lens can be measured.

As described above, the invention provides a method in which higher-order index distribution coefficients are calculated back by a fitting process on the basis of measurement of curvature of field. The curvature of field can be measured accurately even in the case where the diameter of the rod lens is small. Accordingly, even in the case where the invention is used in an optical system requiring performance in diffraction limited, the gradient index distribution can be evaluated with sufficient accuracy.

In addition, the method according to the invention need not use any laser light source. There is also an advantage in that the wavelength for measurement can be selected relatively freely.

What is claimed is:

1. A method of measuring a radial gradient index distribution n(r) of a rod lens by calculating higher-order index distribution coefficients indicating said gradient index distribution n(r) when n(r) is given by the expression:

$$n(r)^2 = n_0^2 \times \{1 - (gr)^2 + h_4(gr)^4 + h_6(gr)^6 + h_8(gr)^8 + \cdots \}$$

in which r is a radial distance measured from an optical axis, $n_0$ is a refractive index on the optical axis, g is a secondary index distribution coefficient, and $h_4$, $h_6$, and $h_8$ are higher-order index distribution coefficients, said method comprising the steps of:

(1) processing said rod lens so that an optic-axial length of said rod lens is approximately equal to P/2 (in which P represents a paraxial period length (pitch) defined as P=2p/g) or approximately equal to an integer multiple of P/2 and so that opposite end surface of said rod lens are shaped like parallel planes;

(2) setting a patterned surface as an object surface in the proximity of one end surface of said rod lens and forming an image surface in the proximity of the other end surface of said rod lens by irradiating said patterned surface with condensed monochromatic light;

(3) obtaining the position of a paraxial focal point and the curve of curvature of field by observing said image surface;

(4) calculating back higher-order index distribution coefficients $h_4$, $h_6$, and $h_8$ by a fitting process on the basis of said position of the paraxial focal point and said curve of curvature of field.

2. A method of measuring a gradient index distribution of a rod lens according to claim 1, wherein said patterned surface has a striped structure in which a large number of straight lines are arranged in parallel with one another or a lattice structure in which a large number of straight lines are arranged crosswise and in parallel with one another so that positions of focal points on a plurality of lines are measured in a direction of the arrangement of lines from a center of said lens to thereby obtain curves of curvature of field of meridional image surface in accordance with distances from the optical axis of said lens.

3. A method of determining higher-order index distribution coefficients $h_4$, $h_6$, and $h_8$ to define a gradient index distribution n(r) of a rod lens:

$$n(r)^2 = n_0^2 \times \{1 - (gr)^2 + h_4(gr)^4 + h_6(gr)^6 + h_8(gr)^8 + \cdots \}$$

in which r is a radial distance measured from an optical axis, $n_0$ is a refractive index on the optical axis, and g is a secondary index distribution coefficient, said method comprising the steps of:

(1) obtaining an image of a predetermined pattern through the rod lens;

(2) obtaining data of positions of meridional focal points on terms of distances from the optical axis of the rod lens based on the obtained image;

(3) fitting a curve, which defines target meridional focal points in terms of the distances from the optical axis and is determined based on the gradient index distribution n(r), onto the obtained data using the higher-order index distribution coefficients $h_4$, $h_6$, and $h_8$ as variables, whereby values of the higher-order index distribution coefficients $h_4$, $h_6$, and $h_8$ are determined.

4. A measuring apparatus for obtaining higher order index distribution coefficient of a gradient index rod lens, comprising:

a light source;

a microscope;

a movable stage located between the light source and the microscope, and providing a predetermined pattern onto which the gradient index rod lens is placed;

a linear gage which obtains height data of the movable stage;

a CCD connected to the microscope to obtain an image of the predetermined pattern through the rod lens and the microscope; and a computing unit connected, at least, to the CCD and the linear gage to obtain data of the image from the CCD and the height data from the linear gage, wherein the computing unit has a storage medium storing therein a program which executes a method comprising the steps of:

(1) obtaining the data of the image of the predetermined pattern through the rod lens, the microscope and the CCD, and the height data through the linear gage;

(2) obtaining data of positions of meridional focal points in terms of distances from the optical axis of the rod lens based on the obtained image data and height data;

(3) fitting a curve, which defines target meridional focal points in terms of the distances from the optical axis and is determined based on the gradient index distribution n (r), onto the obtained data using the higher-order index distribution coefficients $h_4$, $h_5$, and $h_8$ as variables, whereby values of the higher-order index distribution coefficients $h_4$, $h_6$, and $h_8$ are determined.

5. The measuring apparatus according to claim 4, wherein the computing unit calculates the higher order index distribution coefficient based on the data of the image and the height data.

6. The measuring apparatus according to claim 5, wherein the computing unit has a display device which displays the calculated higher order index distribution coefficient.

* * * * *